(12) United States Patent
Swier et al.

(10) Patent No.: US 9,279,895 B2
(45) Date of Patent: Mar. 8, 2016

(54) SEISMIC SENSING DEVICE

(75) Inventors: Kevin E Swier, Albany, OR (US); David A Champion, Lebanon, OR (US); David R. Otis, Jr., Corvallis, OR (US)

(73) Assignee: Shell Oil Company, Houston, TX (US)

( * ) Notice: Subject to any disclaimer, the term of this patent is extended or adjusted under 35 U.S.C. 154(b) by 260 days.

(21) Appl. No.: 14/002,064

(22) PCT Filed: Feb. 28, 2011

(86) PCT No.: PCT/US2011/026498
§ 371 (c)(1),
(2), (4) Date: Dec. 17, 2013

(87) PCT Pub. No.: WO2012/118477
PCT Pub. Date: Sep. 7, 2012

(65) Prior Publication Data
US 2014/0126327 A1 May 8, 2014

(51) Int. Cl.
*G01V 1/16* (2006.01)
*G01V 1/24* (2006.01)
*G01V 1/20* (2006.01)
*G01V 1/22* (2006.01)

(52) U.S. Cl.
CPC ............... *G01V 1/162* (2013.01); *G01V 1/247* (2013.01); *G01V 1/16* (2013.01); *G01V 1/202* (2013.01); *G01V 1/223* (2013.01)

(58) Field of Classification Search
CPC .......... G01V 1/16; G01V 1/162; G01V 1/247
USPC .......................................................... 367/37
See application file for complete search history.

(56) References Cited

U.S. PATENT DOCUMENTS

| 3,691,549 | A | * | 9/1972 | Wilson | 340/527 |
|---|---|---|---|---|---|
| 3,969,711 | A | * | 7/1976 | Ahntholz | 340/651 |
| 4,455,631 | A | * | 6/1984 | San Giovanni | 367/136 |
| 4,586,031 | A | * | 4/1986 | Grinneiser | 340/566 |
| 6,532,190 | B2 | * | 3/2003 | Bachrach | 367/25 |
| 7,078,905 | B2 | * | 7/2006 | Mizuno | 324/326 |
| 7,122,783 | B1 | * | 10/2006 | Pastore et al. | 250/227.14 |
| 7,719,432 | B1 | * | 5/2010 | Hill | 340/602 |
| 2009/0245018 | A1 | * | 10/2009 | Marchetti et al. | 367/14 |
| 2010/0097889 | A1 | * | 4/2010 | Golparian | 367/77 |
| 2012/0220142 | A1 | * | 8/2012 | Swier | 439/76.1 |

OTHER PUBLICATIONS

PCT International Search Report, Application No. PCT/US2011/026498 dated Nov. 30, 2011.

* cited by examiner

*Primary Examiner* — Luke Ratcliffe
*Assistant Examiner* — Amienatta M Ndure Jobe

(57) ABSTRACT

In one example, a land based seismic sensing device includes: a seismic sensing unit having a seismic sensor in a housing configured to be buried in the ground; a control unit including a battery in a weather resistant housing configured to be exposed above ground; and a flexible cable mechanically and electrically connecting the seismic sensing unit and the control unit. The cable includes a weather resistant jacket and an electrically conductive element inside the jacket detachably connected between electronic circuitry in the sensing unit and electronic circuitry in the control unit. In one example, the control unit housing includes a first compartment configured to stow the seismic sensing unit and a second compartment configured to stow the cable.

14 Claims, 7 Drawing Sheets

SEISMIC SENSING DEVICE

PRIORITY CLAIM

The present application is a 371 application of PCT/US2011/026498, filed Feb 28, 2011.

BACKGROUND

Seismic surveys are conducted to map subsurface features, for example to help locate oil and gas reservoirs. Land based seismic surveys may include hundreds or thousands of individual seismic sensors placed in the ground in a grid pattern over an area covering many square kilometers. An explosive charge, seismic vibrator or other suitable source of acoustic energy generates sound waves that propagate through subsurface features. The vibrations of sound waves reflected back toward the surface are sensed by the seismic sensors in the grid. Signals from the sensors are collected and used to map the subsurface features in the survey area. The operating conditions surrounding the seismic sensors can adversely affect the accuracy of the sensors. Wind, windborne debris, rain and other background disturbances can expose the sensors to significant unwanted vibration.

DRAWINGS

The same part numbers are used to designate the same or similar parts throughout the figures.

DESCRIPTION

A new seismic sensing device has been developed to help improve sensor performance. In one example of the new sensing device, the sensing unit is tethered to the control unit through a flexible cable and configured to be buried completely underground. Isolating the sensing unit from the control unit and completely burying it minimizes the adverse effects of wind, windborne debris, rain and other background disturbances. Also, completely burying the sensing unit helps better couple the seismic sensor to ground vibration. In one example, the control unit for the new sensing device includes exterior compartments for stowing the seismic sensing unit and the cable when the sensing unit is not deployed, to help protect the sensing unit during transportation and storage.

The scope of protection for the new sensing device is not limited by these examples or by the specific details described below. Rather, the scope of protection is defined by the Claims that follow this Description.

Figure 1:
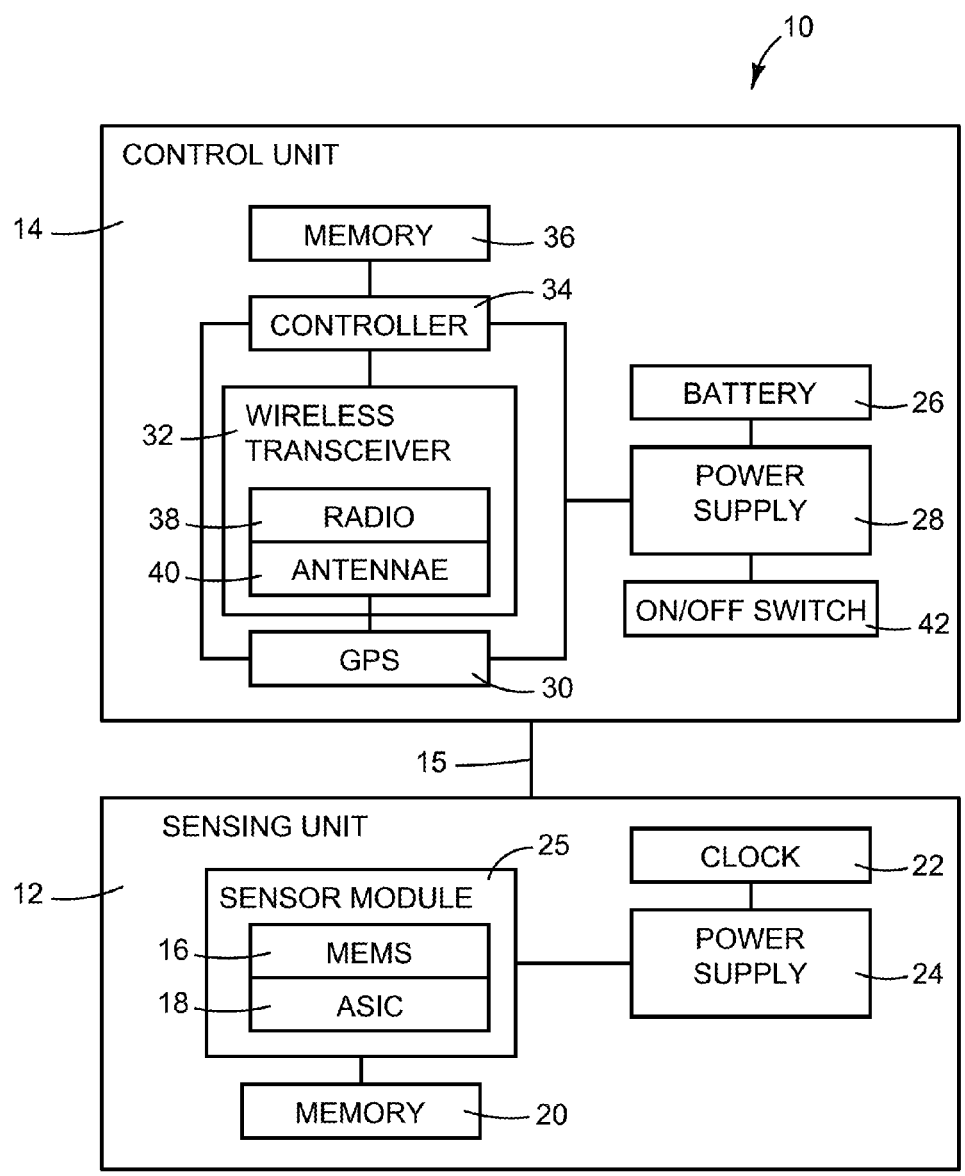
FIG. 1 is a block diagram illustrating one example of a seismic sensing device in which a sensing unit is housed separate from the control unit.
Figure 2:
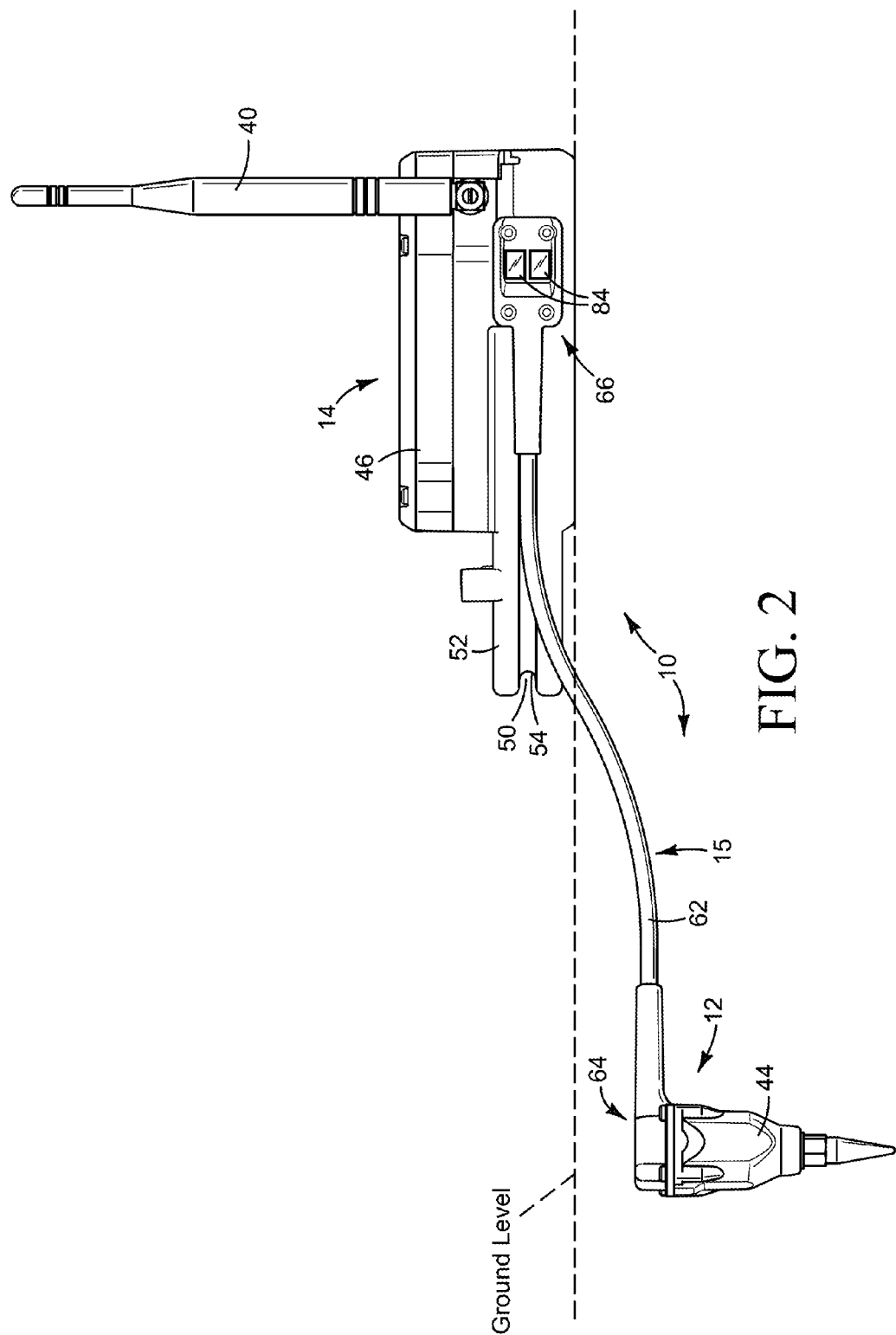
FIG. 2 is an elevation view illustrating one example of a seismic sensing device, such as that shown in FIG. 1, in which the sensing unit is tethered to the control unit through a detachable cable. The sensing device is shown in a deployed configuration in FIG. 2 with the sensing unit completely buried in the ground and the control unit above ground.
Figure 4:
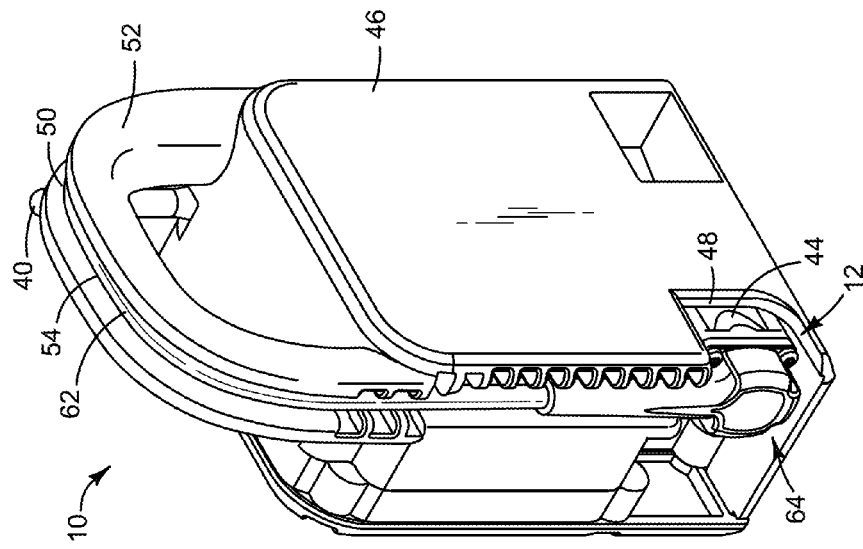
FIGS. 3 and 4 are perspective views of the seismic sensing device of FIG. 2 in an un-deployed configuration in which the sensing unit is stowed on the control unit.

FIG. 1 is a block diagram illustrating one example of a seismic sensing device 10 in which a sensing unit 12 is housed separate from the control unit 14. FIG. 2 is an elevation view illustrating one example implementation of seismic sensing device 10 in which the sensing unit 12 is tethered to the control unit 14 through a detachable cable assembly 15. The sensing device 10 is shown in a deployed configuration in FIG. 2 with the sensing unit 12 completely buried in the ground and the control unit 14 exposed above ground. A seismic sensing device 10 is also sometimes commonly referred to as a "node." A seismic survey may include hundreds or thousands of sensing nodes 10 laid out in a grid pattern over the survey area. The main tasks for each node 10 are to measure ground vibration and store the data representing the measurements until completion of the survey. These tasks must be performed in varied, often extreme environmental conditions.

Referring first to FIG. 1, in the example shown, sensing unit 12 includes an accelerometer MEMS (micro electromechanical system) or other suitable seismic sensor 16, an ASIC (application specific integrated circuit) or other suitable operating circuitry 18, a memory 20, a clock 22, and a power supply 24. Seismic readings taken by sensor 16 may be stored in memory 20 while sensor node 10 is deployed during a survey and subsequently uploaded for mapping along with data from other nodes. ASIC 18 may include, for example, time-sync circuitry so that the timing of seismic readings from sensor 16 may be aligned with the seismic source and readings from other sensor nodes. MEMS sensor 16 and ASIC 18 may be housed together as a single electronic module 25.

In the example shown, control unit 14 includes a rechargeable battery 26, a power supply 28, a GPS (global positioning system) 30, a wireless transceiver 32, and a microcontroller 34 and associated memory 36. Battery 26 powers sensing unit power supply 24 (through cable assembly 15) and control unit power supply 28. A wireless transceiver 32 may include, for example, a radio 38 and antenna 40. Transceiver 32 puts each sensor node 10 in communication with a local operating base, typically a mobile communications center, from which survey activities are controlled.

As described in more detail below with reference to FIG. 5, control unit 14 may also include an on/off switch 42 that detects the presence and/or absence of seismic sensing unit 12 in the control unit stowage compartment. When sensing unit 12 is removed from the stowage compartment, switch 42 automatically turns on device 10 (through control unit 14). When sensing unit 12 is placed into the stowage compartment on control unit 14, switch 42 automatically turns off device 10 (through control unit 14). The use of an automatic on/off switch 42 helps reduce the power consumed by sensing device 10.

FIGS. 2-5 illustrate one example of a seismic sensing device 10 in which the sensing unit 12 is tethered to the control unit 14 through a detachable cable assembly 15. Sensing device 10 is shown in a deployed configuration in FIG. 2, with sensing unit 12 buried in the ground and control unit 14 exposed above ground, and in an un-deployed configuration in FIGS. 3-5, with sensing unit 12 stowed on control unit 14. Referring to FIGS. 2-5, sensing unit 12 includes a housing 44 configured to be completely buried in the ground, as shown in FIG. 2. Sensing unit housing 44 houses the operative components of sensing unit 12, for example an accelerometer MEMS 16, ASIC 18, memory 20, clock 22, and power supply 24 shown in FIG. 1. In the example shown, sensing unit housing 44 forms a spike to make it easier to bury unit 12 underground.

Figure 3:
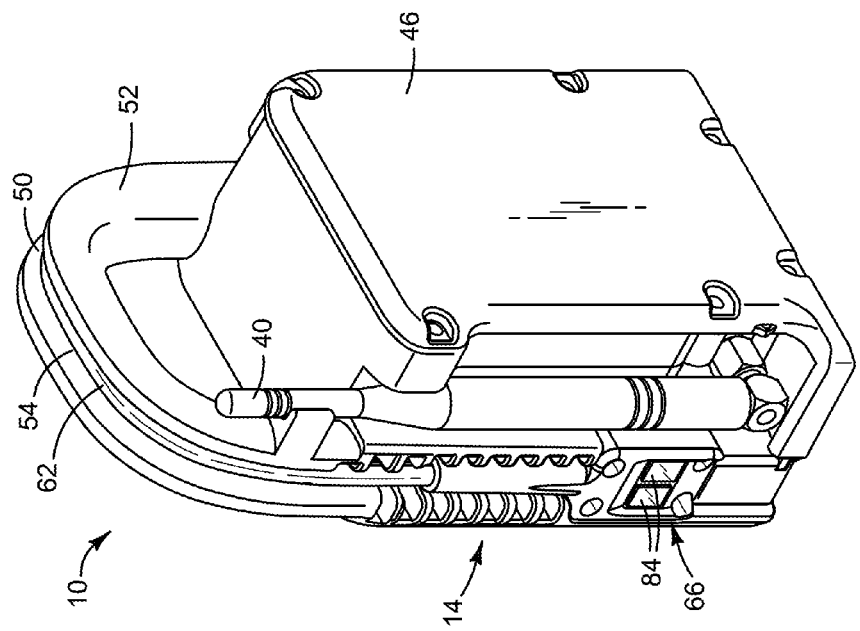

Control unit 14 includes a weather resistant housing 46 configured to be exposed above ground when device 10 is deployed, as shown in FIG. 2. Control unit housing 46 houses the operative components of control unit 12, for example a rechargeable battery 26, a power supply 28, a GPS 30, a wireless transceiver 32, and a microcontroller 34 and associated memory 36 shown in FIG. 1. (Transceiver antenna 40 is shown in FIGS. 2 and 3.) Control unit housing 46 includes an exterior first compartment 48 configured to stow seismic sensing unit 12. Housing 46 also includes an exterior second compartment 50 configured to stow cable assembly 15. In the example shown, control unit housing 46 includes a curved handle 52 and a groove 54 in handle 52 forms the cable stowage compartment 50. Also, in the example shown, sensing unit stowage compartment 48 is positioned at the bottom of housing 46 away from handle 52 and opposite the cable attachment to maximize the length of cable that can be stowed on control unit 14.

Figure 5:
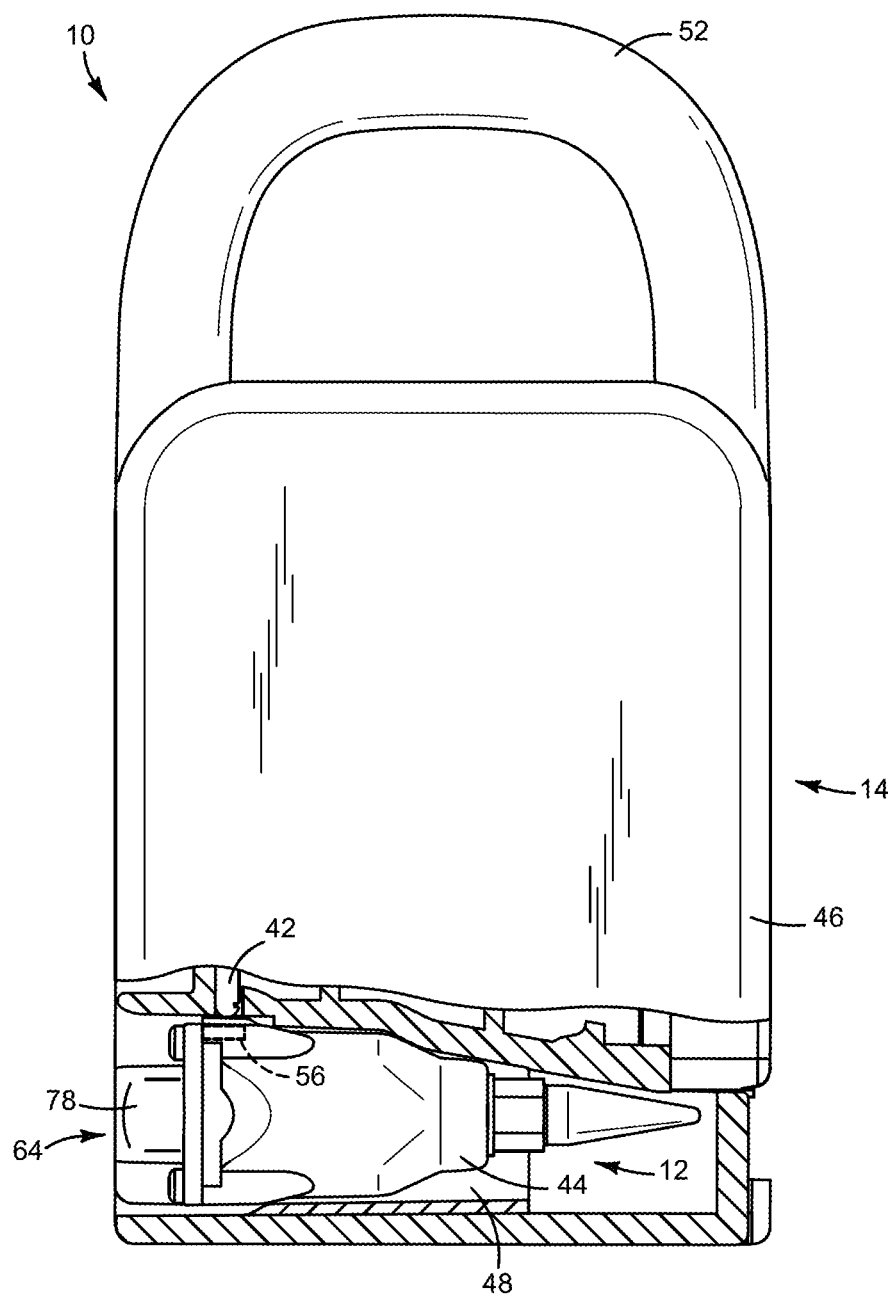
FIG. 5 is a partial cut-away view of the sensing device of FIGS. 2-4 showing in more detail the sensing unit stowed on the control unit.

Referring to FIG. 5, control unit 14 may also include an on/off switch 42 that detects the presence and/or absence of seismic sensing unit 12 in stowage compartment 48 Switch 42 automatically turns control unit 14 on and off depending on the presence of absence of sensing unit 12 in stowage compartment 48. Thus, when seismic sensing unit 12 is removed from stowage compartment 48, switch 42 automatically turns on control unit 14. When sensing unit 12 is placed into stowage compartment 48, switch 42 automatically turns off control unit 14. Although any suitable detector/switch may be used, FIG. 5 depicts generally a Reed switch 42 activated by the presence of a magnet 56 in sensing unit 12.

Figure 6:
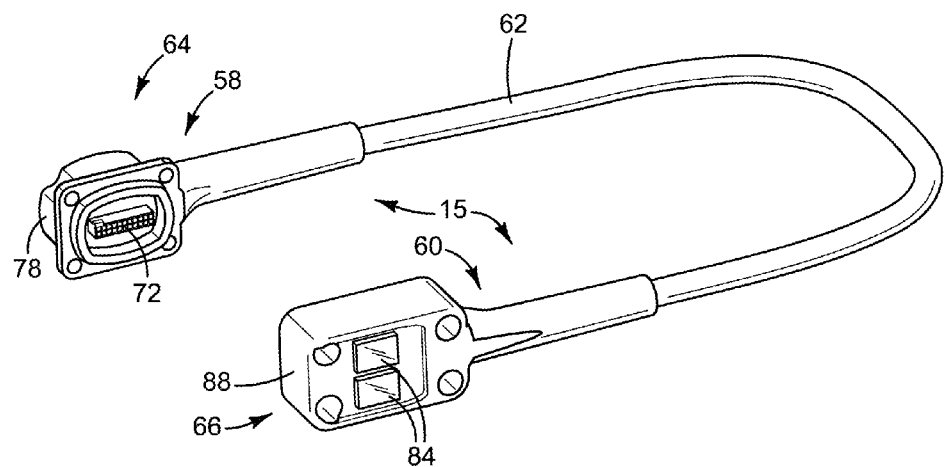
FIGS. 6 and 7 are perspective views illustrating the cable assembly of the sensing device shown in FIGS. 2-4 detached from the sensing unit and the control unit.
Figure 7:
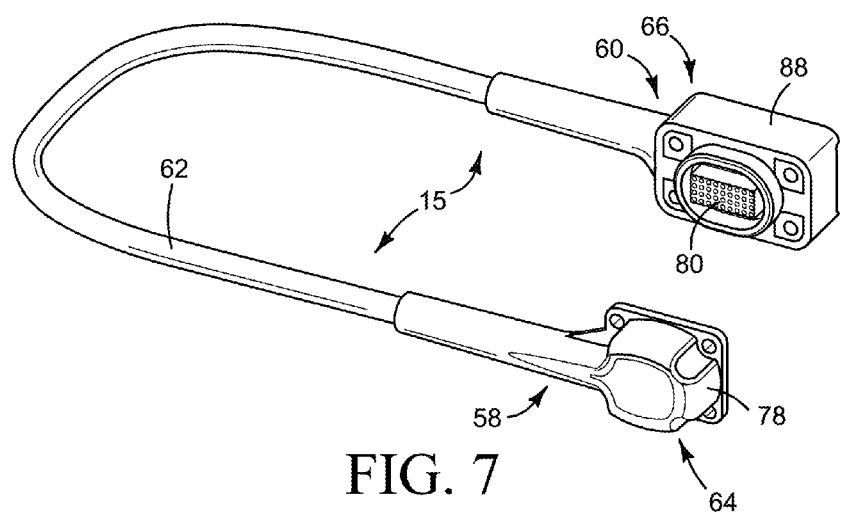
Figure 8:
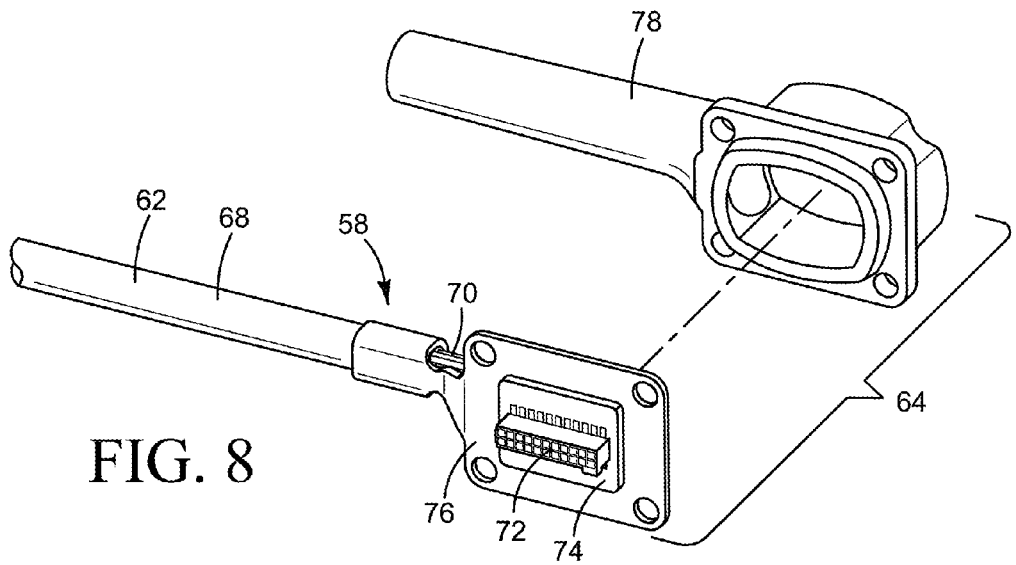
FIG. 8 is a detail view illustrating the cable end from FIGS. 6-7 that connects to the sensing unit.
Figure 9:
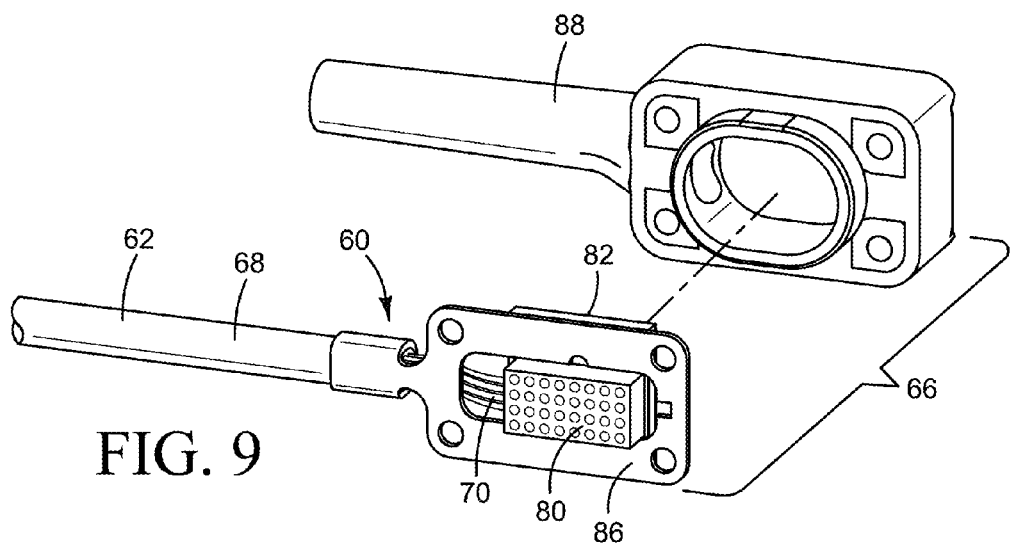
FIGS. 9 and 10 are details views illustrating the cable end from FIGS. 6-7 that connects to the control unit.
Figure 10:
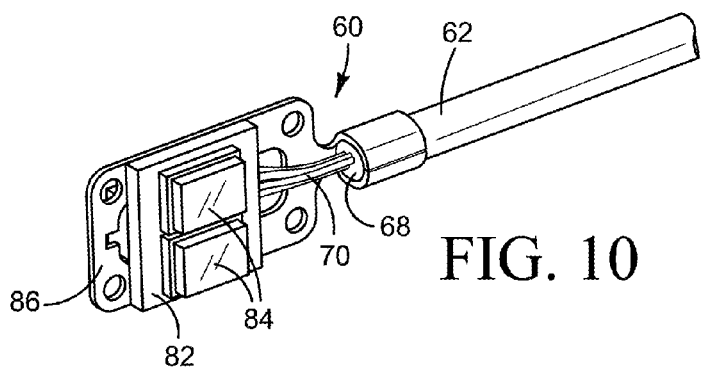

Cable assembly 15 mechanically and electrically connects sensing unit 12 and control unit 14. FIGS. 6 and 7 are perspective views illustrating cable assembly 15 detached from units 12 and 14. FIG. 8 is a detail view illustrating the cable end 58 that connects to sensing unit 12. FIGS. 9 and 10 are detail views illustrating the cable end 60 that connects to control unit 14. Referring to FIGS. 6-10, cable assembly 15 includes a cable 62, a first connector assembly 64 at end 58 for detachably connecting to sensing unit 12, and a second connector assembly 66 at end 60 for detachably connecting to control unit 14. Cable 62 includes a weather resistant jacket 68 and a set of electrical conductors 70 inside jacket 68. (The exposed ends of conductors 70 are visible in FIGS. 8-10.)

Referring to FIGS. 6 and 8, first connector assembly 64 includes a pin connector 72 mounted to a printed circuit board 74 that is connected to cable conductors 70. Printed circuit board 74 is supported on a rigid frame 76 attached to one end of cable 62. The parts are covered by an elastomeric molding or other suitable weather resistant protective cover 78. Pin connector 72 is exposed through cover 78 for connecting to a corresponding connector in sensing unit 12. An elastomeric cover 78 helps seal the connection when cover 78 is secured to sensing unit housing 44 with screws or other suitable fasteners, as shown in FIGS. 2, 3 and 5.

Referring to FIGS. 6, 7, 9 and 10, second connector assembly 66 includes a pin connector 80 mounted to one side of a printed circuit board 82 and a pair of conductive contact pads 84 mounted to the other side of printed circuit board 82. Printed circuit board 82 is connected to cable conductors 70 and supported on a rigid frame 86 attached to the other end of cable 62. The parts are covered by an elastomeric molding or other suitable weather resistant protective cover 88. Pin connector 80 is exposed through one side of cover 88 for connecting to a corresponding connector in control unit 14. Contact pads 84 are exposed through the other side of cover 88 for connecting to a circuit external to control unit 14. An elastomeric cover 88 helps seal the connection when cover 88 is secured to control unit housing 46 with screws or other suitable fasteners, as shown in FIGS. 2 and 3.

Figure 11:
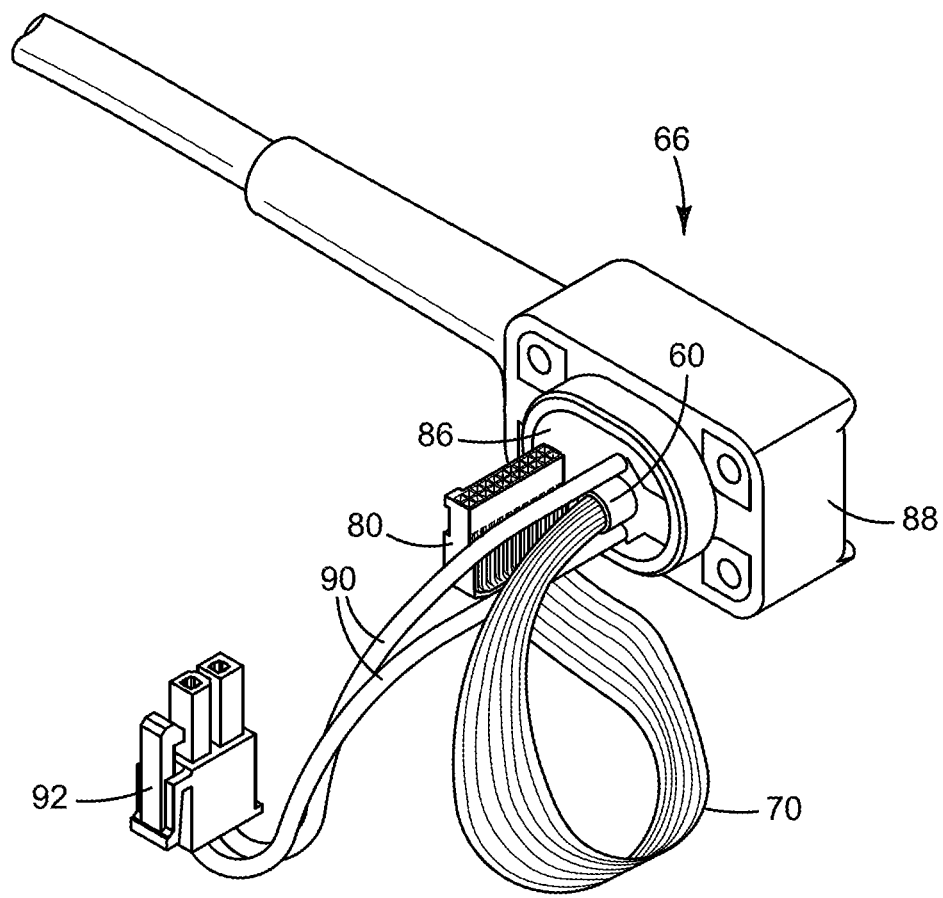
FIG. 11 is a detail view showing another example for the cable end that connects to the control unit.

In another example for second connector assembly 66, shown in FIG. 11, the pin connector and printed circuit board are omitted. Referring to FIG. 11, the end 60 of cable 62 extends through protective cover 88. Cable conductors 70 are connected directly to a connector 80 for making a detachable connection to a mating connector (not shown) in control unit 14. In this example, contact pads 84 (FIG. 6) are supported by a rigid frame 86 that also serves as a spacer within protective cover 88. The wiring 90 for contact pads 84 is connected separately to a second connector 92 for connection to a mating connector (not shown) in control unit 14.

Contact pads 84, for example, may be connected to a charging circuit for a rechargeable battery 26 in control unit 14 (through PCB 82 and connector 80). The exposed charging pads 84 connect with mating contacts in a charging module configured to hold control unit 14 when seismic sending device 10 is not deployed. Although two contact pads 84 are shown, any suitable number of pads may be used. Integrating battery charging contacts 84 into a detachable/replaceable cable assembly 15 has several benefits. First, each replacement cable 15 gives fresh charge contacts 84 to the control unit 14, helping to increase the reliability of control unit 14. Second, the need for an additional penetration into control unit housing 46 is avoided, also helping to increase the reliability of control unit 14. Third, the need for an additional printed circuit board or other circuitry to support the charge pads is avoided, helping to reduce the cost of control unit 14. And, of course, the use of a detachable and therefore replaceable cable assembly 15 in general helps extend the useful life of sensing unit 12 and control unit 14.

As noted at the beginning of this Description, the examples shown in the Figures and described above do not limit the scope of the invention. Other examples are possible. Accordingly, these and other examples, implementations, configurations and details may be made without departing from the spirit and scope of the invention, which is defined in the following Claims.

What is claimed is:

1. A land based seismic sensing device, comprising:
   a seismic sensing unit including a seismic sensor in a sensing unit housing configured to be buried in the ground;
   a control unit including a battery in a weather resistant control unit housing configured to be exposed above ground; and
   a flexible cable mechanically and electrically connecting the seismic sensing unit and the control unit, the cable including a weather resistant jacket and an electrically conductive element inside the jacket and detachably connected between electronic circuitry in the sensing unit and electronic circuitry in the control unit,
   where the control unit housing includes a first compartment configured to stow the seismic sensing unit.

2. The device of claim 1, where the control unit housing includes a second compartment configured to stow the cable.

3. The device of claim 2, where the control unit housing includes a curved handle and the second compartment comprises a groove in the handle for retaining the cable when the seismic sensing unit is stowed in the first compartment.

4. The device of claim 1, where the control unit also includes a detector positioned near the first compartment for detecting the presence and/or absence of the seismic sensing unit in the first compartment.

5. The device of claim 4, where the detector comprises a switch configured to turn on an electronic element in the control unit when the seismic sensing unit is removed from the first compartment.

6. The device of claim 4, where the detector comprises a switch configured to turn off an electronic element in the control unit when the seismic sensing unit is placed into the first compartment.

7. The device of claim 4, where the detector comprises a switch configured to turn on an electronic element in the control unit when the seismic sensing unit is removed from the first compartment and to turn off an electronic element in the control unit when the seismic sensing unit is placed into the first compartment.

8. The device of claim 1, further comprising a switch configured to turn on an electronic element in the control unit when the seismic sensing unit is removed from the first compartment and to turn off the electronic element when the seismic sensing unit is placed into the first compartment.

9. A land based seismic sensing device, comprising:
    a seismic sensing unit including a seismic sensor in a sensing unit housing configured to be buried in the ground;
    a control unit including a battery in a control unit housing, the control unit housing including a first compartment configured to stow the seismic sensing unit and a second compartment configured to stow the cable; and
    a flexible cable mechanically and electrically connecting the seismic sensing unit and the control unit, the cable including a weather resistant jacket and an electrically conductive element inside the jacket and connected between electronic circuitry in the sensing unit and electronic circuitry in the control unit.

10. The device of claim 9, where the control unit housing includes a curved handle and the second compartment comprises a groove in the handle for retaining the cable when the seismic sensing unit is stowed in the first compartment.

11. The device of claim 9, where the cable is detachably connected between electronic circuitry in the sensing unit and electronic circuitry in the control unit.

12. The device of claim 11, where the cable also includes:
    a first electrical connector connected to the cable conductor at a first end of the cable and configured to make a detachable electrical connection to the sensing unit;
    a weather resistant first cover protecting the first end of the cable and the first connector, the first connector exposed through the first cover for connecting to the sensing unit;
    a second electrical connector connected to the cable conductor at a second end of the cable and configured to make a detachable electrical connection to the control unit; and
    a weather resistant second cover protecting the second end of the cable and the second connector, the second connector exposed through the second cover for connecting to the control unit.

13. A land based seismic sensing device, comprising:
    a seismic sensing unit including a seismic sensor in a sensing unit housing configured to be buried in the ground;
    a control unit; and
    a flexible cable electrically connecting the seismic sensing unit and the control unit; and where
    the control unit includes:
        a housing;
        a battery in the housing; and
        a switch;
        the control unit housing configured to stow the seismic sensing unit and the cable; and
        the switch configured to turn off an electronic element in the control unit when the seismic sensing unit is placed into the first compartment.

14. The device of claim 13, where the switch is also configured to turn on an electronic element in the control unit when the seismic sensing unit is removed from the first compartment.

* * * * *